United States Patent
Khapali et al.

(10) Patent No.: US 11,481,620 B2
(45) Date of Patent: Oct. 25, 2022

(54) INTELLIGENT RETRAINING OF DEEP LEARNING MODELS UTILIZING HYPERPARAMETER SETS

(71) Applicant: International Business Machines Corporation, Armonk, NY (US)

(72) Inventors: Mahadev Khapali, Bangalore (IN); Shashank Vijaykumar Vagarali, Bangalore (IN); Yugandhra Rayanki, Bangalore (IN); Prabhu S. Padashetty, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 16/524,232

(22) Filed: Jul. 29, 2019

(65) Prior Publication Data
US 2021/0034960 A1   Feb. 4, 2021

(51) Int. Cl.
*G06N 3/00* (2006.01)
*G06N 3/08* (2006.01)
*G06N 20/20* (2019.01)

(52) U.S. Cl.
CPC .............. *G06N 3/08* (2013.01); *G06N 3/084* (2013.01); *G06N 20/20* (2019.01)

(58) Field of Classification Search
CPC ........... G06N 3/08; G06N 20/20; G06N 3/084
See application file for complete search history.

(56) References Cited

U.S. PATENT DOCUMENTS

| | | | |
|---|---|---|---|
| 8,533,224 B2 * | 9/2013 | Lin | G06N 20/00 707/777 |
| 10,209,974 B1 | 2/2019 | Patton | |
| 2017/0323216 A1 | 11/2017 | Fano | |
| 2019/0043070 A1 * | 2/2019 | Merrill | G06N 5/003 |
| 2019/0065989 A1 | 2/2019 | Kida | |

(Continued)

FOREIGN PATENT DOCUMENTS

WO    2019028468 A1   2/2019

OTHER PUBLICATIONS

"Retrain and deploy a machine learning model", Azure Machine Learning Studio, Feb. 13, 2019, 7 pages, <https://docs.microsoft.com/en-us/azure/machine-learning/studio/retrain-models-programmatically>.

(Continued)

*Primary Examiner* — Pakee Fang
(74) *Attorney, Agent, or Firm* — Randy Tejeda

(57) ABSTRACT

In an approach to deriving highly accurate models, one or more computer processors train a set of machine learning models utilizing a training set and a deep learning algorithm; generate one or more feedback data sets for each model in the set of trained models; rank each model in the set of trained models based on the generated feedback data sets; dynamically adjust one or more thresholds, that initiate a retraining or deployment of one or more ranked models, based, at least in part, on one or more production environment requirements; responsive to exceeding one or more adjusted thresholds, automatically deploy one or more ranked models to one or more deployment environments based, at least in part, on the ranking of the one or more trained models; responsive to not exceeding one or more adjusted thresholds, retrain each model in the set of trained models.

17 Claims, 4 Drawing Sheets

(56) References Cited

U.S. PATENT DOCUMENTS

2019/0073570 A1  3/2019  Turco
2019/0095756 A1* 3/2019  Agrawal .............. G06K 9/6271
2019/0102693 A1* 4/2019  Yates .................... G06N 5/003

OTHER PUBLICATIONS

"Retraining Models on New Data", Amazon Machine Learning, © 2019 Amazon Web Services, Inc. 1 page, <https://docs.aws.amazon.com/machine-learning/latest/dg/retraining-models-on-new-data.html>.

* cited by examiner

| Timestamp | Model UUID | Model GUID | Model Label | Training Set GUID | Delta | Accuracy | Mean Squared Error | Training Duration (s) | Production Server |
|---|---|---|---|---|---|---|---|---|---|
| 2019-06-26 02:31:29 | 6026a | 7d6a | Primary | aea5b | .2142 | .9138 | 4.41 | 7132 | prodserver1.example |
| 2019-06-26 02:30:25 | 6026B | 7d6a | Secondary | aea5b | .1643 | .8834 | 6.25 | 7034 | prodserver1.example |
| 2019-06-26 02:32:51 | 6026c | 7d6a | AUX1 | aea5b | .2343 | .5248 | 6.76 | 7320 | prodserver1.example |
| 2019-03-26 11:19:45 | 230eb | 4e0f | Primary | b3cda | .0175 | .7628 | 182.25 | 3245 | prodserver2.example |
| 2019-03-26 11:20:01 | 230ec | 4e0f | Secondary | b3cda | .0512 | .6594 | 187.89 | 3324 | prodserver2.example |
| 2019-03-26 11:19:13 | 230ed | 4e0f | AUX1 | b3cda | .0104 | .6432 | 190.44 | 3213 | prodserver2.example |

FIG. 3

INTELLIGENT RETRAINING OF DEEP LEARNING MODELS UTILIZING HYPERPARAMETER SETS

BACKGROUND

The present invention relates generally to the field of machine learning and more particularly to deep model training.

In machine learning, a hyperparameter is a configuration that is external to the model and whose value cannot be estimated from data. Hyperparameters are used in processes to help estimate model parameters. Hyperparameter are set before the learning (e.g., training) process begins. By contrast, the values of other parameters are derived via training. Different model training algorithms require different hyperparameters, some simple algorithms, such as ordinary least squares regression, require none. Given a set of hyperparameters, a training algorithm learns the parameter values from the data. For instance, least absolute shrinkage and selection operator (LASSO) is an algorithm that adds a regularization hyperparameter to ordinary least squares regression, required to be set before estimating the parameters through the training algorithm. Similar machine learning models can require different hyperparameters (e.g., different constraints, weights, or learning rates) to generalize different data patterns.

Artificial neural networks (ANN) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in image recognition, ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from the learning material. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

A recurrent neural network (RNN) is a class of ANN where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. For an LSTM, the learning rate followed by the network size are the most crucial hyperparameters.

SUMMARY

Embodiments of the present invention disclose a computer-implemented method, a computer program product, and a system for deriving highly accurate models. The method includes one or more computer processors training a set of machine learning models utilizing a training set and a deep learning algorithm, wherein each model in the set of machine learning models is trained using a respective hyperparameter of a one or more created hyperparameter sets. The one or more computer processors generate one or more feedback data sets for each model in the set of trained models. The one or more computer processors rank each model in the set of trained models based on the generated feedback data sets. The one or more computer processors dynamically adjust one or more thresholds, that initiate a retraining or deployment of one or more ranked models, based, at least in part, on one or more production environment requirements. The one or more computer processors, responsive to exceeding one or more adjusted thresholds, automatically deploy one or more ranked models to one or more deployment environments based, at least in part, on the ranking of the one or more trained models. The one or more computer processors, responsive to not exceeding one or more adjusted thresholds, retrain each model in the set of trained models based, at least in part, on the ranking of each trained model and corresponding hyperparameter sets.

BRIEF DESCRIPTION OF THE DRAWINGS

FIG. 3 depicts table 300 illustrating an exemplary populated self-learning table 126, in accordance with an embodiment of the present invention.

DETAILED DESCRIPTION

Highly accurate and reliable deep learning models require input data that has a similar distribution as the training data utilized to train said models. Continuous model maintenance, retraining, and optimization is required to maintain highly accurate and reliable predictions, especially when considering data distribution drift. As models age, the training data utilized becomes radically distinguishable from data that is inputted at later stages. Models must be constantly retrained, modified, adjusted, and/or altered to account for data distribution drift and the impact on model accuracy and reliability.

Embodiments of the present invention allow for intelligent hyperparameter optimization and model retraining to maintain model effectiveness and accuracy over time. Embodiments of the present invention recognize that model accuracy and reliability is improved by responsively retraining a plurality of models based on a plurality of changes to a plurality of associated statistical model values. Embodiments of the present invention recognize that maintaining and utilizing a self-learning table allows for an efficient data distribution disparity identification and subsequent hyperparameter, weight, and training data optimization based on associated statistics contained in the self-learning table. Embodiments of the present invention recognize that model and system efficiency is improved by deploying a plurality of models to a plurality of environments based on model, environment, system, server requirements and statistics. Implementation of embodiments of the invention may take a variety of forms, and exemplary implementation details are discussed subsequently with reference to the Figures.

The present invention will now be described in detail with reference to the Figures.

Figure 1:
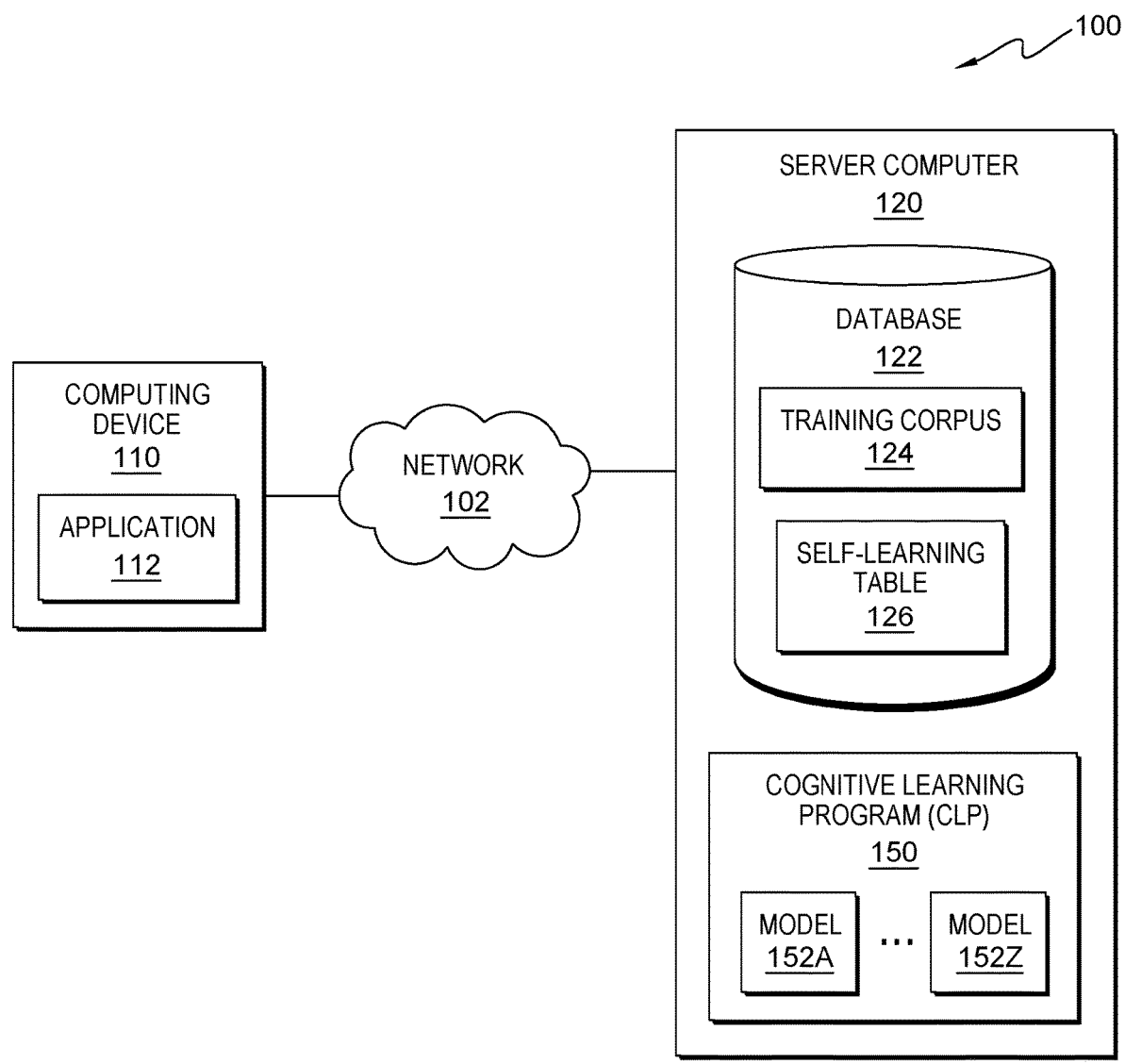
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In the depicted embodiment, computing device 110 contains application 112.

Application 112 is a set of one of more programs designed to carry out the operations for a specific application to assist a user to perform an activity (e.g., word processing programs, spread sheet programs, media players, web browsers). In an embodiment, application 112 is a set of one or more program designed to interact, modify, and present one or more aspects of a cognitive or deep learning model. For example, application 112 utilizes a graphical user interface allowing a plurality of users to select and view statistics, feedback, and/or related data regarding one or more models. In the depicted embodiment, application 112 resides on computing device 110. In another embodiment, application 112 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and cognitive learning program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by cognitive learning program 150. In the depicted embodiment, database 122 resides on server computer 120. In another embodiment, database 122 may reside on computing device 110 or elsewhere within computational environment 100 provided cognitive learning program 150 has access to database 122. A database is an organized collection of data. Database 122 can be implemented with any type of storage device capable of storing data and configuration files that can be accessed and utilized by cognitive learning program 150, such as a database server, a hard disk drive, or a flash memory. In the depicted embodiment, database 122 contains training corpus 124 and self-learning table 126. In an embodiment, database 122 contains multiple instances of self-learning table 126. In this embodiment, said instances are grouped and stored based on model type, training data similarity, hyperparameter/hyperparameter set similarity, etc.

Training corpus 124 contains one or more examples, sets of training data, data structures, and/or variables used to fit the parameters of a specified model. The contained data comprises of pairs of input vectors with associated output vectors. In an embodiment, training corpus 124 may contain one or more sets of one or more instances of unclassified or classified (e.g., labelled) data, hereinafter referred to as training statements. In another embodiment, the training data contains an array of training statements organized in labelled training sets. For example, a plurality of training sets include "positive" and "negative" labels paired with associated training statements (e.g., words, sentences, etc.). In an embodiment, each training set includes a label and an associated array or set of training statements which can be utilized to train one or more models. In an embodiment, training corpus 124 contains unprocessed training data. In an alternative embodiment, training corpus 124 contains natural language processed (NLP) (e.g., section filtering, sentence splitting, sentence tokenizer, part of speech (POS) tagging, tf-idf, etc.) feature sets. In a further embodiment, training corpus 124 contains vectorized (i.e., one-hot encoding, word embedded, dimension reduced, etc.) training sets, associated training statements, and labels.

Self-learning table 126 contains data used by cognitive learning program 150, such as feedback data including, but not limited to, predictive accuracy (e.g., Brier scores, Gini coefficients, discordant ratios, C-statistic values, net reclassification improvement indexes, receiver operating characteristics, generalized discrimination measures, Hosmer-Lemeshow goodness of fit values, etc.), error rates (e.g., root mean squared error (RMSE), mean absolute error, mean absolute percentage error, mean percentage error, etc.), precision, overfitting considerations, model fitness, and related environment/system/server statistics (e.g., memory utilization, CPU utilization, storage utilization, etc.). Based on the type of the model, cognitive learning program 150 will determine the appropriate model feedback methods and techniques (e.g., testing/validation algorithms, associated data types, features, and vectors) that best capture the predictive effectiveness of the model. For example, Hosmer-Lemeshow tests are frequently utilized to determine good of fit for logistic regression models. In another embodiment, instances of self-learning table 126 contain links to other instances of self-learning table 126 that are relevant to one or more model features, statistics, and/or characteristics. In various embodiments, self-learning table 126 contains a universally unique identifier (UUID) for every referenced model, a globally unique identifier (GUID) for every model group, and a GUID referencing the training set utilized in training. In one embodiment, self-learning table 126 contains references or link to a plurality of environments, systems, and servers (e.g., production, testing, auxiliary, etc.) associated with, or intended for, a model. In various embodiments, the self-learning 126 contains links to related or historical models. For example, an exemplary row of data pertaining to a specific model contains links to historical models (e.g., models from previous trainings or iterations). In another embodiment, the self-learning table contains statistics from every historical model and subsequent iteration (e.g., retraining cycle). In this embodiment, the utilized training data and hyperparameters are stored. In an alternative embodiment, the self-learning 126 is data differenced in which only differences in data (e.g., differences between model hyperparameters and weights) between models are maintained in self-learning 126. In this embodiment, the models and associated hyperparameters are differenced every training, retraining, or iteration. In another embodiment, self-learning table 126 contains a label or classification for every model representing a plurality of rankings (e.g., primary, secondary, auxiliary, etc.) determined by cognitive learning program 150. FIG. 3 depicts can exemplary illustration of an instance of self-learning table 126.

Models 152A through 152Z contain a plurality of models utilizing deep learning techniques to train, calculate weights, ingest inputs, and output a plurality of solution vectors. In an embodiment, models 152A through 152Z may include any number of and/or combination of models and model types. Models 152A through 152Z are representative of a plurality of deep learning models, techniques, and algorithms (e.g., decision trees, Naive Bayes classification, support vector machines for classification problems, random forest for classification and regression, linear regression, least squares regression, logistic regression). In an embodiment, models 152A through 152Z each utilize transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, models 152A through 152Z are recurrent neural networks (RNN) trained utilizing supervised training methods. In an embodiment, models 152A through 152Z each utilize gated recurrent units (GRU). GRUB simplify the training process while reducing the amount of necessary computational resources. In another embodiment, models 152A through 152Z each utilize LSTM. LSTM entails a more robust process, requiring more computational resources but LSTM is more effective when training from large datasets. In various embodiments, the hidden layers of models 152A through 152Z each may be unidirectional or bidirectional.

Cognitive learning program (CLP) 150, hereinafter CLP 150, is a program for intelligently training and retraining a plurality of internal or external models, such as models 152A through 152Z. In various embodiments, CLP 150 maintains self-learning table 126 and associated data such as model statistics, parameters, metrics, and/or vectors. In an embodiment, CLP 150 creates and maintains an instance of self-training table 126 for every model, such as the models respectively represented in model 152A through 152Z. CLP 150 maintains, stores, modifies, and monitors self-learning table 126. Responsive to a trained model, CLP 150 conducts a plurality of tests and validation methods in order to calculate a plurality of feedback data values that are subsequently added to self-learning table 126. For example, after an exemplary neural network finishes training, CLP 150 calculates the predictive accuracy of said network utilizing one or more testing and validation sets. In this example, the predictive accuracy data is added to an associated row or entry in self-learning table 126. In an embodiment, CLP 150 triggers or initiates model evaluation, validation, and testing responsive to model data (e.g., feedback) delta (e.g., differenced) exceeding a predetermined or specified (i.e., user, system, model, etc.) delta threshold. For example, responsive to the delta feedback reaching 20% of the training data, CLP 150 will trigger an evaluation, generate feedback data, and update self-learning table 126. In another embodiment, CLP 150 triggers or initiates model evaluation, validation, and testing responsive to a plurality of feedback data entries exceeding a feedback data threshold amount or any number of contained parameters and values (e.g., predictive accuracy, error rates, etc.), contained within an self-learning table 126 entry, are exceeding a threshold range. For example, CLP 150 may monitor predictive accuracy statistics and responsively trigger or initiate an evaluation and model retraining when the predictive accuracy of a plurality of models exceeds a predictive accuracy threshold. In another embodiment, CLP 150 dynamically adjusts one or more thresholds, further described in step 212 of FIG. 2.

CLP 150 is a program for deriving highly accurate models. In the depicted embodiment, CLP 150 is a standalone software program. In another embodiment, the functionality of CLP 150, or any combination programs thereof, may be integrated into a single software program. In some embodiments, CLP 150 may be located on separate computing devices (not depicted) but can still communicate over network 102. In various embodiments, client versions of CLP 150 reside on computing device 110 and/or any other computing device (not depicted) within computational environment 100. In various embodiments, CLP 150 may implement the following steps. CLP 150 creates or adjusts a plurality of hyperparameter and training data sets. CLP 150 trains a plurality of models using the created or adjusted plurality of hyperparameter sets and training sets. CLP 150 stores and deploys the trained models to a plurality of environments including production, test, and auxiliary environments, systems, and/or servers. CLP 150 generates a plurality of feedback data sets corresponding to the plurality of trained models and stores said feedback data sets into self-learning table 126. CLP 150 ranks the trained models using the feedback data. CLP 150 dynamically adjusts one or more thresholds associated with one or more model feedback statistics. CLP 150 monitors a plurality of features contained within the feedback sets, in addition to feedback data delta. Responsive to a exceeding a feedback data threshold, CLP 150 adjusts the hyperparameters and training sets and retrains the previously trained models. CLP 150 generates additional feedback data on the retrained models. CLP 150 selects and deploys the highest ranked model to a production environment. CLP 150 is depicted and described in further detail with respect to FIG. 2.

The present invention may contain various accessible data sources, such as database 122, that may include personal storage devices and content the user wishes not to be used, CLP 150 allows the user to opt in or opt out of exposing persona information. CLP 150 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 2:
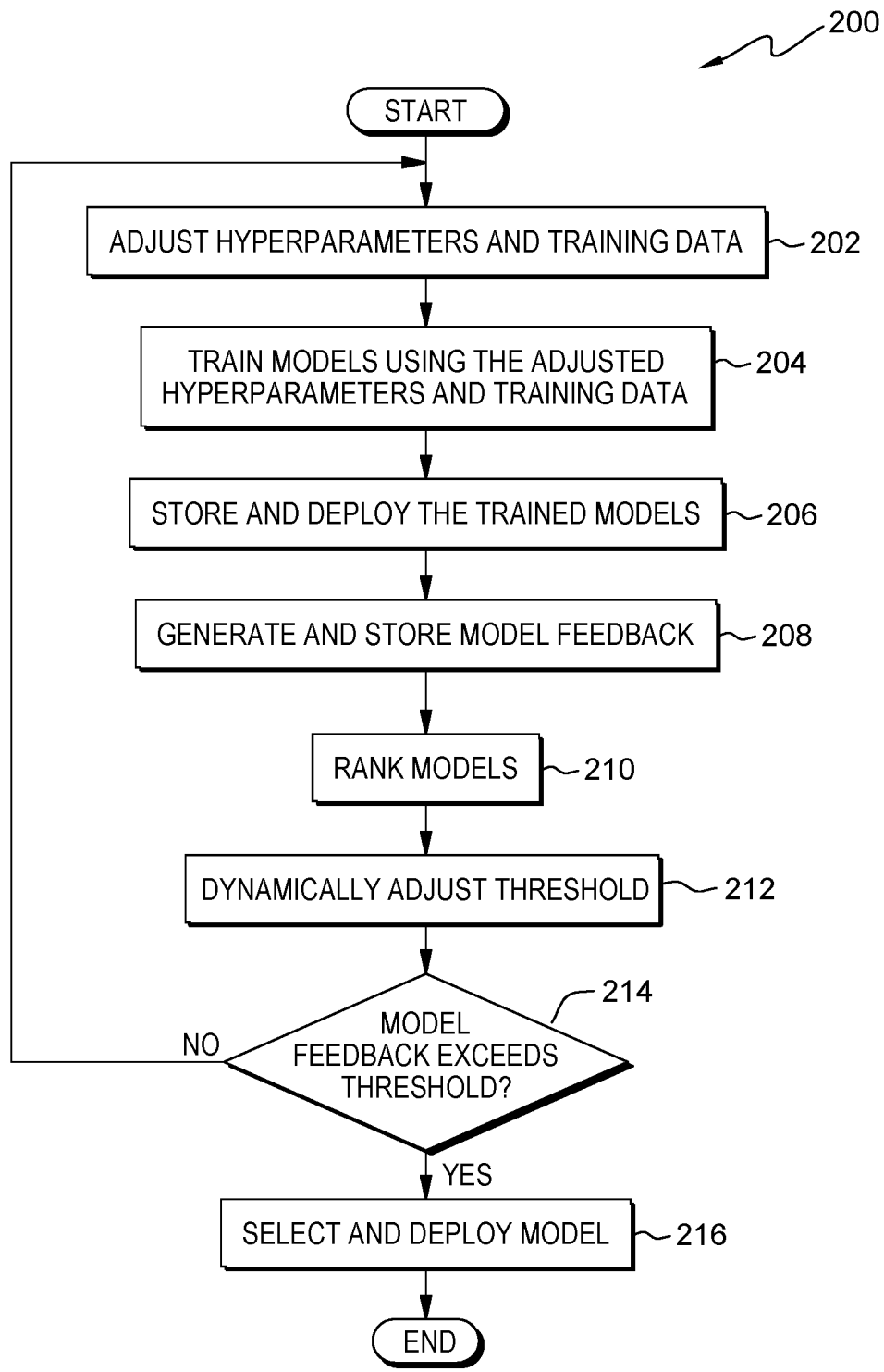
FIG. 2 is a flowchart depicting operational steps of a program, on a server computer within the computational environment of FIG. 1, for deriving highly accurate models, in accordance with an embodiment of the present invention.

FIG. 2 is a flowchart depicting operational steps of CLP 150 for deriving highly accurate models, in accordance with an embodiment of the present invention.

CLP 150 adjusts hyperparameters and training data (step 202). In an embodiment, CLP 150 partitions training data, associated information, and vectors, contained within training corpus 124, into multiple training, testing, and validation sets. Dependent on the utilized training method (supervised vs unsupervised), said sets are classified, paired, associated, and/or linked with one or more labels or output vectors. In another embodiment, CLP 150 partitions training set data into discrete sets containing multiple versions of the same set and label, for example, sets processed utilizing different NLP techniques. In yet another embodiment, CLP 150 constructs training subsets by identifying the scope of the associated label and segmenting the training data into discrete section, subject, or categorical sets. In various embodiments, CLP 150 non-deterministically divides the processed sets into training, validation, test sets. In a further embodiment, CLP 150 attaches a corresponding label to each constructed training set. In various embodiments, CLP 150 utilizes cross validation techniques, such as K-Fold cross validation, to create one or more testing and validation sets.

CLP 150 then vectorizes the partitioned training sets. Vectorization transforms iterative operations into matrix operations, allowing modern CPUs to accelerate machine learning and deep learning operations. In an embodiment, CLP 150 utilizes one-hot encoding techniques to vectorize categorical or string-based (word/term based) feature sets. For example, when vectorizing feature sets of individual words, CLP 150 creates a one-hot encoded vector comprising a 1×N matrix, where N symbolizes the number of distinguishable terms. In this embodiment, CLP 150 utilizes one-hot encoding to recode categorical data into a vectorized form. For example, when vectorizing an example term feature set consisting of [positive, numerical, string], CLP 150 encodes said corresponding feature set into the array containing [[1,0,0], [0,1,0], [0,0,1]]. In one embodiment, CLP 150 utilizes featuring scaling techniques (e.g., rescaling, mean normalization, etc.) to vectorize and normalize numerical feature sets. In various embodiments, CLP 150 utilizes word embedding techniques such as word2vec or doc2vec to produce vectors which denote similarities between words that share common contexts. Word embedding techniques create word-based vectors, similar to one-hot encoding, although word embedding creates vectors that are structured so that similar features are positioned in close proximity to each other in the vector space. In another embodiment, CLP 150 utilizes dimension reducing techniques, such as feature extraction, low-dimensional embedding, and kernelling, to reduce the number of dimensions required to represent the training data and features. Reducing the numbers of required dimensions (e.g., features, variables, etc.) reduces the needed time and storage space, improves the interpretation of the parameters of the cognitive model, allows data visualization in low dimensions such as 2D or 3D and avoids peaking phenomena.

CLP 150 then initializes models 152A through 152Z with one or more weights and associated hyperparameters. In an embodiment, CLP 150 initializes a plurality of models with randomly generated weights. In an alternative embodiment, CLP 150 initializes models 152A through 152Z with weights calculated from the analysis described above (e.g., tf-idf, etc.). In various embodiments, CLP 150 utilizes weights utilized in historical or previously iterated/trained models. In this embodiment, certain features are weighted higher than others allowing the model to learn at a quicker rate with fewer computational resources. For example, the weights of a previously trained model, that failed to exceed an accuracy threshold, are utilized in a subsequent training iteration. In an embodiment, models 152A through 152Z may each be represented as one or more deep learning models such as a simple neural network or a specialized neural network such as a Markov chain, perceptron, recurrent neural network, deep feed forward (DFF), Boltzmann machine, support vector machine (SVM), neural Turing machine, etc.

CLP 150 then creates or adjusts one or more distinct sets of hyperparameters for the training sets constructed above. For example, for every training set, n, CLP 150 generates one or more sets of hyperparameters associated with that training set, k wherein k is equal to the numbers of elements in the largest hyperparameter set, thus CLP 150 may maintain n*k distinct models containing distinguishable training data, training sets, and hyperparameters. In this embodiment, CLP 150 constructs a plurality of hyperparameter sets associated with a plurality of model sets utilizing a plurality of heuristics common in deep learning such as deriving hyperparameters based on the number of: leaves or depth of a tree, latent factors in a matrix factorization, learning rate, hidden layers in a neural network, and the number of clusters. In various embodiments, CLP 150 generates hyperparameter sets and associated training sets based on historical models and associated feedback data. For example, if a historical model and associated feedback data suggest that a reduced hyperparameter may increase predictive accuracy, or any other significant metric, then CLP 150 creates a new set of hyperparameters which reduced values pairing and storing said hyperparameters. In yet another embodiment, CLP 150 constructs a plurality of hyperparameter sets randomly or utilizing a nondeterministic heuristic. In another embodiment, CLP 150 adjusts one or more training sets in a similar fashion to CLP 150 adjusting one or more hyperparameter sets.

CLP 150 trains models using the adjusted hyperparameters and training data (step 204). In an embodiment, CLP 150 maintains one or more sets of models wherein each set share training sets, machine learning techniques, and deep learning structures and/or architectures (e.g., deep Boltzmann machines, deep convolutional networks, etc.) but the utilized hyperparameters and weights can be distinct. CLP 150 trains models 152A through 152Z by utilizing a plurality of training methods (e.g., supervised, unsupervised, etc.) based on the constructed feature vectors, as detailed in step 202. In an embodiment, CLP 150 trains models 152A through 152Z with a plurality of feature vectors originating from the sets extracted from the training data and associated label located in training corpus 124. CLP 150 determines the appropriate training methods dependent on the model type of models 152A through 152Z. For example, if the models 152A through 152Z are recurrent neural networks, then CLP 150 utilizes a supervised training method. In another embodiment, the user may specify a training method to utilize such as unsupervised training, etc. In the depicted embodiment, CLP 150 utilizes processed training sets to perform supervised training of models 152A through 152Z. As would be recognized by one skilled in the art, supervised training determines the difference between a prediction and a target (i.e., the error), and back-propagates the difference through the layers such that said model "learns." In an embodiment, CLP 150 determines whether a sufficient accuracy is obtained by utilizing test sets and the associated test labels. In another embodiment, CLP 150 utilizes cross-entropy (e.g., Kullback-Leibler (KL) divergence, etc.) as a loss function to determine the level of accuracy of the model. In this embodiment, CLP 150 compares the predicted sequence with the expected sequence. In yet another embodiment, CLP 150 may utilize the cross-entropy loss value to calculate error rate which further denotes the level of accuracy of the model. If the calculated accuracy is insufficient, then CLP 150 continues with supervised training. If the calculated accuracy is determined sufficient, then CLP 150 ends the training process.

CLP 150 stores and deploys the trained models (step 206). Responsive to CLP 150 training one or more models, CLP 150 stores said models (e.g., database 122, self-learning table 126). In an embodiment, CLP 150 stores links to each stored model within self-learning table 126 along with associated feedback data, statistics, and historical/related models. CLP 150 deploys the trained models 152A through 152Z to a plurality of production, test, and auxiliary environments. In an embodiment, said testing environments are structured and created to mimic associated production environments. In this embodiment, said testing environments duplicate system/computational resources, system tools/programs, and dependencies available to an associated production environment. In another embodiment, test and auxiliary environments are structurally, systemically, and programmatically indistinguishable from production environments.

CLP 150 generates and stores model feedback (step 208). CLP 150 runs one or more evaluation, validation, and testing methods on the trained models 152A through 152Z (e.g., current model), utilizing testing environments. CLP 150 may generate feedback data sets, feedback data, and feedback statistics including, but not limited to, predictive accuracy (e.g., Brier scores, Gini coefficients, discordant ratios, C-statistic values, net reclassification improvement indexes, receiver operating characteristics, generalized discrimination measures, Hosmer-Lemeshow goodness of fit values, etc.), error rates (e.g., root mean squared error (RMSE), mean absolute error, mean absolute percentage error, mean percentage error, etc.), precision, overfitting considerations, model fitness, and related system statistics (e.g., memory utilization, CPU utilization, storage utilization, etc.). In various embodiment, CLP 150 utilizes the statistics of historical or previously trained (e.g., model iterations, etc.) to calculate a delta value between the current and historical model. For example, CLP 150 calculates the difference between two training sets and stores the difference as a delta value in self-learning table 126.

In an embodiment, CLP 150 utilizes "blackbox" testing methods to generate feedback data despite potential differences in input data, output data, training methods, and general model structure. In this embodiment, CLP 150 utilizes a plurality of testing and validation techniques and methods, such as model performance (e.g., cross validation), metamorphic testing (e.g., metamorphic relationship between input-output pairs), dual coding (e.g., utilizing the same features and data but training another type of model), coverage guided fuzzing, linear model comparisons, etc. For example, CLP 150 conducts multiple rounds of cross validation to assess the performance of a model, generate feedback data and statistics, and reduce the variance of the generated feedback data and statistics. In an embodiment, CLP 150 monitors system resources, generates system statistics (e.g., average/peak memory utilization, average/peak CPU utilization, average/peak GPU utilization, storage utilization, runtimes (e.g., training runtimes and model utilization runtimes), and stores said system statistics within an associated row or section of self-learning table 126. In another embodiment, the user can trigger CLP 150 to manually run one or more tests.

CLP 150 periodically and continuously monitors and maintains information regarding the amount of feedback data and statistics associated, referenced, and stored within self-learning table 126. In an embodiment, CLP 150 monitors the differences (e.g., delta feedback) between the feedback data between multiple iterations of previous, related, and historical trained models. In this embodiment, the training sets and associated data remain the same but the hyperparameters and weights are modified by one or more training iterations. In an embodiment, if self-learning 126 contains one or more fields associated with a model, then CLP 150 appends future feedback data to said fields.

CLP 150 ranks models (step 210). In an embodiment, CLP 150 utilizes one or more statistics or values contained within self-learning table 126 to arrange, rank, and/or order models 152A through 152Z. CLP 150 may rank one or more models based on a plurality of factors, specified by the user, or the model, based on statistics, metrics, and values found within self-learning table 126 such as predictive accuracy, error rates, training duration, etc. For example, CLP 150 ranks models 152A through 152Z based on a predictive accuracy metric. In this example, higher rank models have a higher predictive accuracy than lower ranked models. In another embodiment, the ranking functions as a priority score for the plurality of models allowing CLP 150 to determine the most effective model based on plurality of feedback data values. In an embodiment, CLP 150 assigns or reassigns a model with a label (e.g., primary, secondary, auxiliary, etc.) corresponding to the relative ranking of said model. For example, CLP 150 assigns the highest ranked model with the label of primary. In another embodiment, model labels have associated or intended environments, detailing where to deploy a labelled model. In an embodiment, CLP 150 assigns ranks according to the relative rank of a model compared to other historical models.

In an embodiment, CLP 150 assigns weights to a plurality of features based on system, model, or user preferences. For example, CLP 150 utilizes the weight of a feature as a measure of the prominence (e.g., importance) of said feature. In another embodiment, CLP 150 may assign individual weights to each feature based on application settings, production preferences, model parameters, or user preferences, and generate a composite score (e.g., numerical representation). For example, CLP 150 may generate composite scores calculated on a scale of 0 to 100 where greater values (e.g., 80) represent a greater importance and lower numbers (e.g., 20) would indicate a lesser importance. In an embodiment, CLP 150 utilizes the aforementioned composite score to rank the models. In this embodiment, higher ranked models are deemed more suitable or appropriate (e.g., conform to the largest number of requirements or standards) than lower ranked models. In various embodiments, CLP 150 utilizes a predetermined rank or score threshold, based on user, application, or model preferences, eliminating any models having a composite score or rank less than or below said threshold.

CLP 150 dynamically adjusts a threshold (step 212). In an embodiment, CLP 150 may utilize a plurality of models to dynamically adjust one or more thresholds that determine when to trigger or initiate CLP 150 to evaluate, train/retrain, classify/reclassify, and store models 152A through 152Z corresponding to a plurality of entries in self-learning table 126. CLP 150 determines which threshold (e.g., accuracy, reliability, storage, etc.) to utilize and adjusts the threshold value amount (e.g., a 20% training set delta, etc.). In an embodiment, the user specifies the threshold type and/or value. In other embodiment, the model, system, and/or production server requirements/purpose dictates the threshold type and/or value. For example, an exemplary production server may only have sufficient computational storage for a small model (e.g., >500 megabytes). In this example, CLP 150 adjusts the threshold to track model storage requirements and adjusts the value to conform with the requirements of the production server (i.e., >500 megabytes).

In an embodiment, CLP 150 trains and utilizes one or more deep learning models (i.e., cognitive or threshold models) to assess a plurality of thresholds (e.g., thresholds based on: feedback data delta, predictive accuracy, error rates, training duration, model capacity, etc.) by retrieving and considering different features (e.g., entries contained with self-learning table 126 along with associated hyperparameters, statistics, training data, related models, etc.), available as structured or unstructured data, and applying relative numerical weights. In the depicted embodiment, CLP 150 utilizes one or more recurrent neural networks. In this embodiment, CLP 150 is trained utilizing vectorized training sets of feature data (e.g., feedback data of historical or grouped models) that are labelled with an associated threshold (e.g., type and value) enabling CLP 150 to learn which thresholds are correlated to specific models and associated performance, accuracy, and system feedback values/data. In an alternative embodiment, models are labelled with feedback data statistics such as overall predictive accuracy or any statistic determined to comprehensively describe the model. CLP 150 utilizes the trained model to identify and determine statistical patterns that demonstrate which thresholds correlate to expected corresponding value, parameters, and features. CLP 150 then feds the trained recurrent neural network with current feedback statistics/data and utilizes one or more calculations to adjust one or more corresponding thresholds. In an embodiment, labels correspond to the relative ranking of one or more models.

If the model feedback does not exceed a threshold ("No" branch, decision block 214), then CLP 150 returns to adjusting hyperparameters and training data (step 202). In this embodiment, CLP 150 utilizes the highest ranked model and associated statistics to retrain the model and any models associated and/or grouped with the highest ranked model. In another embodiment, CLP 150 utilizes associated hyperparameters, training sets, and/or calculated historical weights to train subsequent models. In various embodiments, CLP 150 utilizes hyperparameters, weights and/or training sets associated with related historical models to retrain, as detailed in step 202, one or more model that did not exceed the threshold.

If the model feedback exceeds a model threshold ("Yes" branch, decision block 214), then CLP 150 selects and deploys the model (step 216). In an embodiment, CLP 150 selects the highest ranked model, as described in step 210, and deploys said model to a production environment or server. In various embodiments, CLP 150 may select multiple ranked models and deploy the models to the same production environment or deploy the models to a plurality of respective production, test, or auxiliary environments. In another embodiment, CLP 150 determines which deployment environment to deploy a model out of a plurality of deployment environments (e.g., test, production, backup server, containers, or virtual machines). For example, if a model requires 20 gigabytes of storage space to operate and a specified production environment only has 10 gigabytes available, then CLP 150 eliminates said production environment and selects an environment that can support said model. In an embodiment, the user instructs CLP 150 to deploy a specific model. In this embodiment, the user may utilize application 112 to display models 152A through 152Z and allow the user the ability to select one or more displayed models. In a further embodiment, user inputs, via application 112, a destination server for CLP 150 to deploy models 152A through 152Z.

FIG. 3 depicts 300 illustrating an exemplary populated self-learning table 126, in accordance with an embodiment of the present invention. Table 300 includes a row corresponding to a plurality of trained models containing a plurality of model specific statistics described in database 122 and in self-learning table 126. Every row, wherein each row corresponds to a distinct model, in table 300 includes a timestamp, universally unique identifier (UUID), globally unique identifier (GUID), model label (e.g., primary, secondary, auxiliary), training set GUID, delta value, predictive accuracy statistic, mean squared error (MSE), training duration in seconds, and location/description of the target production server.

Figure 4:
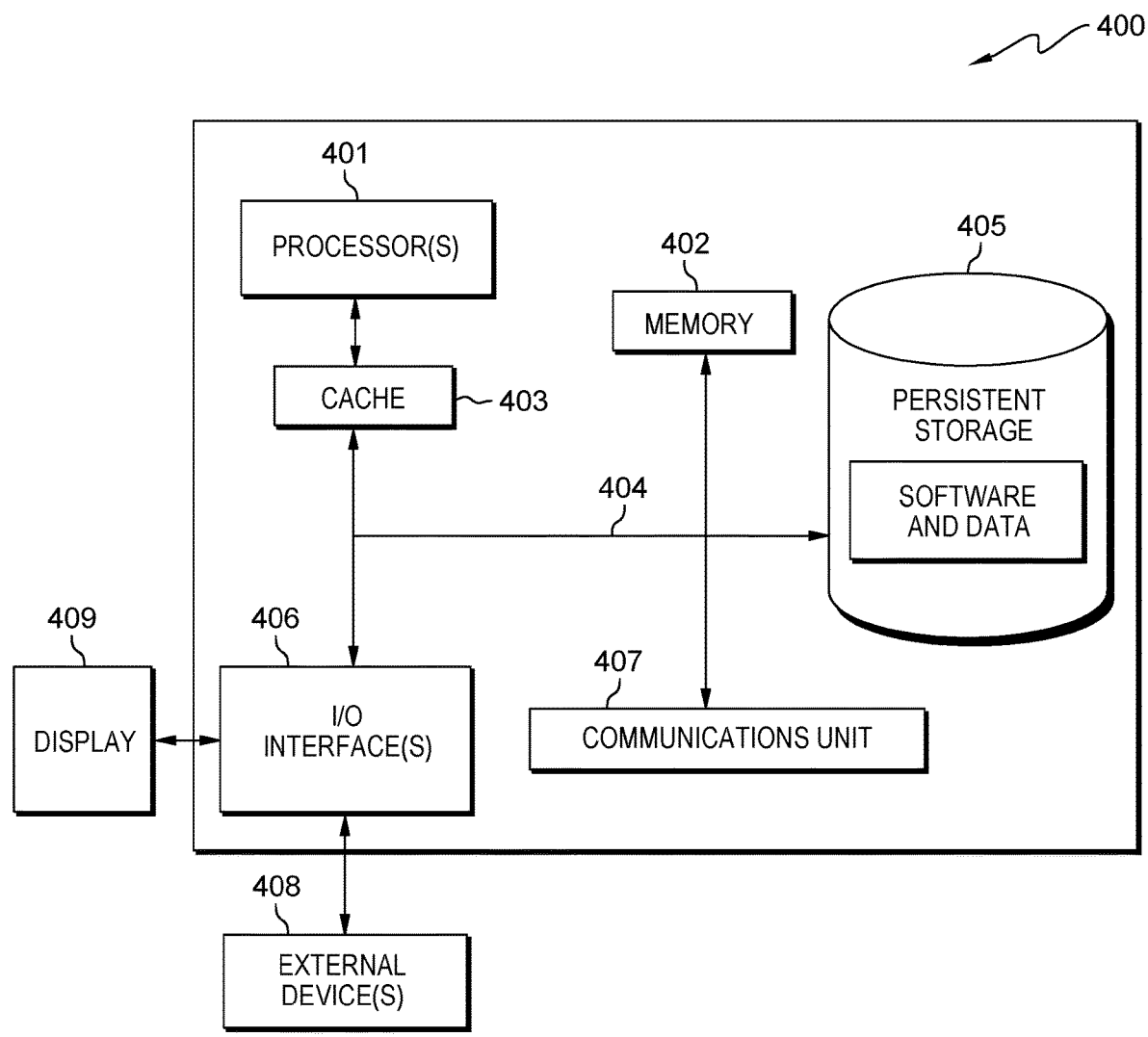
FIG. 4 is a block diagram of components of a computing device and the server computer, in accordance with an embodiment of the present invention.

FIG. 4 depicts a block diagram of components of computing device 110 and server computer 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

CLP 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. CLP 150 may be downloaded to persistent storage 405 through communications unit 407.

I/O interface(s) 406 allows for input and output of data with other devices that may be connected to computing device 110 and server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., CLP 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   training, by one or more computer processors, a set of machine learning models utilizing a training set and a deep learning algorithm, wherein each model in the set of machine learning models is trained using a respective hyperparameter of a one or more created hyperparameter sets;
   generating, by one or more computer processors, one or more feedback data sets for each model in the set of trained models;
   ranking, by one or more computer processors, each model in the set of trained models based on the generated feedback data sets;
   dynamically adjusting, by one or more computer processors, one or more thresholds, that initiate a retraining or deployment of one or more ranked models, based, at least in part, on one or more production environment requirements, comprising:
      retrieving, by one or more computer processors, historical feedback data sets that are generated from previously trained models, wherein the historically trained models utilize the deep learning algorithm and training set;
      training, by one or more computer processors, one or more cognitive models based on the retrieved historical feedback data sets, wherein the one or more cognitive models are trained to identify statistical patterns between historical feedback data sets and thresholds;
      feeding, by one or more computer processors, feedback datasets generated from a current model of the set of models into the one or more trained cognitive models;
      adjusting, by one or more computer processors, a threshold type and a threshold value of one or more thresholds based on one or more calculations by the one or more trained cognitive models utilizing the fed feedback data sets;
   responsive to exceeding one or more adjusted thresholds, automatically deploying, by one or more computer processors, one or more ranked models to one or more deployment environments based, at least in part, on the ranking of the one or more trained models; and responsive to not exceeding one or more adjusted thresholds, retraining, by one or more computer processors, each model in the set of trained models based, at least in part, on the ranking of each trained model and corresponding hyperparameter sets.

2. The method of claim 1, wherein generating one or more feedback data sets for each model in the set of trained models comprises:
deploying, by one or more computer processors, the one or more trained models to one or more test environments;
calculating, by one or more computer processors, one or more feedback data sets based on the one or more trained models; and
storing, by one or more computer processors, the one or more calculated feedback data sets in a self-learning table.

3. The method of claim 2, wherein the test environments are systemically, programmatically, and structurally indistinguishable to an associated production environment.

4. The method of claim 1, wherein feedback data includes predictive accuracy statistics, error rates, precision statistics, overfitting considerations, model fitness statistics, related system statistics, and related deployment environment statistics.

5. The method of claim 1, further comprising:
assigning, by one or more computer processors, a label to the ranked trained model wherein the labels are selected from the group consisting of: primary labels, secondary labels, and a plurality of auxiliary labels.

6. The method of claim 5, wherein the label corresponds to a relative rank of the model and to a set of deployment environments.

7. The method of claim 6, comprises:
deploying, by one or more computer processors, one or more models to one or more environments based on the assigned label and the set of deployment environments.

8. The method of claim 1, wherein the one or more cognitive models are recurrent neural networks.

9. A computer program product comprising:
one or more computer readable storage media and program instructions stored on the one or more computer readable storage media wherein the computer readable storage media is not a transitory signal per se, the stored program instructions comprising:
program instructions to train a set of machine learning models utilizing a training set and a deep learning algorithm, wherein each model in the set of machine learning models is trained using a respective hyperparameter of a one or more created hyperparameter sets;
program instructions to generate one or more feedback data sets for each model in the set of trained models;
program instructions to rank each model in the set of trained models based on the generated feedback data sets;
program instructions to dynamically adjust one or more thresholds, that initiate a retraining or deployment of one or more ranked models, based, at least in part, on one or more production environment requirements, comprising:
program instructions to retrieve historical feedback data sets that are generated from previously trained models, wherein the historically trained models utilize the same deep learning algorithm and training sets;
program instructions to train one or more cognitive models based on the retrieved historical feedback data sets, wherein the one or more cognitive models are trained to identify statistical patterns between historical feedback data sets and thresholds;
program instructions to feed feedback data sets generated from a current model of the set of models into one or more trained cognitive models;
program instructions to adjust a threshold type and a threshold value of one or more thresholds based on one or more calculations by one or more trained cognitive models utilizing the fed feedback data sets;
program instructions to, responsive to exceeding one or more adjusted thresholds, automatically deploy one or more ranked models to one or more deployment environments based, at least in part, on the ranking of the one or more trained models; and
program instructions to, responsive to not exceeding one or more adjusted thresholds, retrain each model in the set of trained models based, at least in part, on the ranking of each trained model and corresponding hyperparameter sets.

10. The computer program product of claim 9, wherein the program instructions to generate one or more feedback data sets for each model in the set of trained models comprise:
program instructions to deploy the one or more trained models to one or more test environments;
program instructions to calculate one or more feedback data sets based on the one or more trained models; and
program instructions to store the one or more calculated feedback data sets in a self-learning table.

11. The computer program product of claim 9, wherein feedback data includes predictive accuracy statistics, error rates, precision statistics, overfitting considerations, model fitness statistics, related system statistics, and related deployment environment statistics.

12. The computer program product of claim 9, wherein the program instructions stored on the one or more computer readable storage media comprise:
program instructions to assign a label to the ranked trained model wherein the labels are selected from the group consisting of: primary labels, secondary labels, and a plurality of auxiliary labels.

13. The computer program product of claim 9, wherein the one or more cognitive models are recurrent neural networks.

14. A computer system comprising:
one or more computer processors;
one or more computer readable storage media, wherein the computer readable storage media is not a transitory signal perse; and
program instructions stored on the computer readable storage media for execution by at least one of the one or more processors, the stored program instructions comprising:
program instructions to train a set of machine learning models utilizing a training set and a deep learning algorithm, wherein each model in the set of machine learning models is trained using a respective hyperparameter of a one or more created hyperparameter sets;
program instructions to generate one or more feedback data sets for each model in the set of trained models;

program instructions to rank each model in the set of trained models based on the generated feedback data sets;

program instructions to dynamically adjust one or more thresholds, that initiate a retraining or deployment of one or more ranked models, based, at least in part, on one or more production environment requirements, comprising:

program instructions to retrieve historical feedback data sets that are generated from previously trained models, wherein the historically trained models utilize the same deep learning algorithm and training sets;

program instructions to train one or more cognitive models based on the retrieved historical feedback data sets, wherein the one or more cognitive models are trained to identify statistical patterns between historical feedback data sets and thresholds;

program instructions to feed feedback data sets generated from a current model of the set of models into one or more trained cognitive models;

program instructions to adjust a threshold type and a threshold value of one or more thresholds based on one or more calculations by one or more trained cognitive models utilizing the fed feedback data sets;

program instructions to, responsive to exceeding one or more adjusted thresholds, automatically deploy one or more ranked models to one or more deployment environments based, at least in part, on the ranking of the one or more trained models; and program instructions to, responsive to not exceeding one or more adjusted thresholds, retrain each model in the set of trained models based, at least in part, on the ranking of each trained model and corresponding hyperparameter sets.

15. The computer system of claim 14, wherein the program instructions to generate one or more feedback data sets for each model in the set of trained models, comprise:

program instructions to deploy the one or more trained models to one or more test environments;

program instructions to calculate one or more feedback data sets based on the one or more trained models; and program instructions to store the one or more calculated feedback data sets in a self-learning table.

16. The computer system of claim 14, wherein feedback data includes predictive accuracy statistics, error rates, precision statistics, overfitting considerations, model fitness statistics, related system statistics, and related deployment environment statistics.

17. The computer system of claim 14, wherein the one or more cognitive models are recurrent neural networks.

* * * * *